June 7, 1927.
J. M. SIMPSON
1,631,938
AUTOMOBILE TRANSMISSION
Filed Aug. 14, 1925
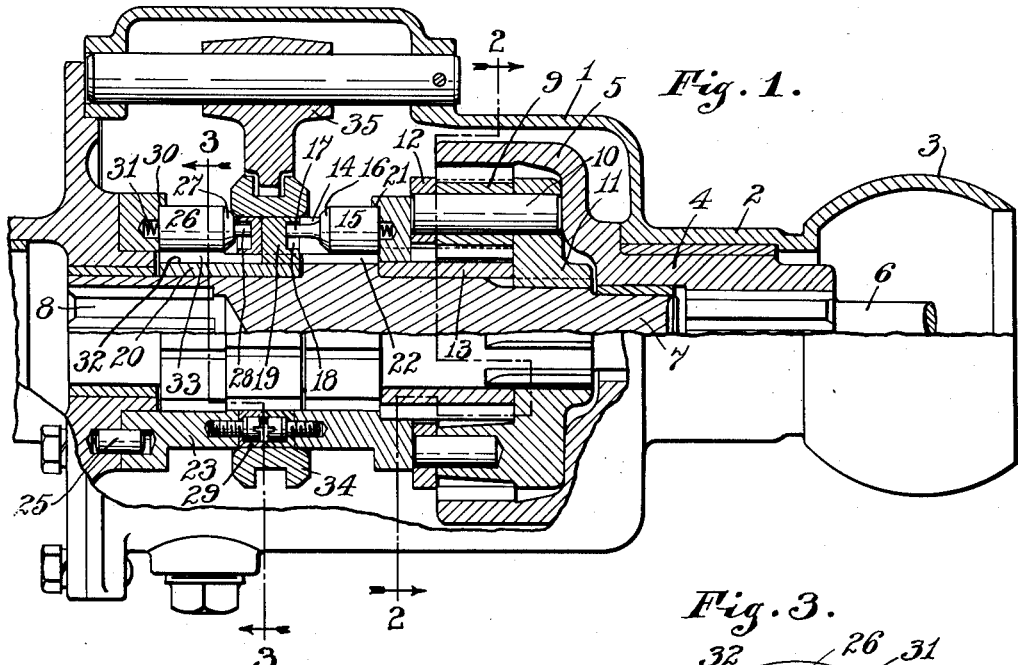
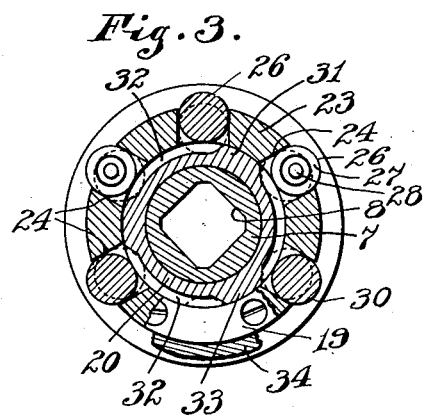
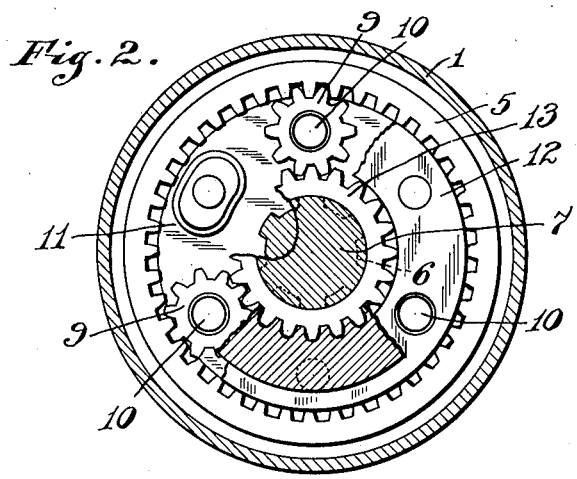
INVENTOR.
John M. Simpson,
BY
Hood + Hahn.
ATTORNEYS Patented June 7, 1927.

1,631,938

UNITED STATES PATENT OFFICE.

JOHN M. SIMPSON, OF MUNCIE, INDIANA, ASSIGNOR TO WARNER GEAR COMPANY, OF MUNCIE, INDIANA, A CORPORATION OF INDIANA.

AUTOMOBILE TRANSMISSION.

Application filed August 14, 1925. Serial No. 50,169.

My invention relates to improvements in transmissions and has particular reference to the planetary gear type of transmission.

One of the objects of my invention is to provide a transmission of the above type having one or more changes of speed and in which the speed change may be effected quietly and with the minimum effort.

Another object of my invention is to provide a transmission of the above type which may be readily manufactured and quickly assembled.

For the purpose of disclosing my invention I have illustrated one embodiment thereof in the accompanying drawings in which Fig. 1 is a longitudinal sectional view of a transmission embodying my invention;

Fig. 2 is a transverse section taken on the line 2—2 of Fig. 1, and

Fig. 3 is a similar section taken on the line 3—3 of Fig. 1.

In the embodiment illustrated I provide an enclosing casing 1 having at one end an extension 2 ending in a spherical head 3 forming one portion of a ball and socket joint. The extension 2 has journaled therein a hub 4 of a ring or internal gear 5 mounted within the casing and this hub 4 is provided with a squared end for a driving shaft 6. Piloted in the hub 4 is one end of a driven shaft 7 having its opposite end journaled in the opposite end of the casing 1 and provided with a squared socket 8 to receive the end of an extension of this driven shaft. The ring gear 5 surrounds and forms a housing for and meshes with a plurality of pinions 9 of a planetary gear transmission, which pinions are mounted on pins 10 in turn carried by a pinion carrier 11 keyed on the shaft 7. The outer ends of the pins 10 socket in a retaining ring 12. The sun gear 13 of the planetary gear transmission is rotatably mounted on the shaft 7 and meshes with the pinions 9. This sun gear also has connected thereto a clutch member comprising a hub provided with a plurality of radially disposed slots 14 in which operate a plurality of rollers 15. These rollers are of different lengths, the long rollers and short rollers alternating and each roller is provided with a beveled end 16 terminating in a pin end 17. The pin ends of the rollers operate in guide slots 18 in a collar 19 forming a part of the hub and splined on a sleeve 20 rotatably mounted on the shaft 7. The butt ends of the rollers operate in guide slots 21 in an annular ring portion of the hub which annular ring portion is provided with internal teeth meshing with the teeth of the sun gear 13 and this annular ring portion abuts against the ring 12 of the pinions 9. Suitable coiled springs are arranged in a recess in the hub and abut against the butt ends of the rollers 15 to provide sufficient friction to hold the rollers against gravity in their outer-most position when the parts are idle. The rollers 15 are adapted to be moved into radial recesses formed between a series of splines 22 on the shaft 7 and when moved into the recesses lock the sun gear 13 to the shaft 7. A second clutch member comprising a hub 23 having radial slots 24 is locked to the casing 1 by means of suitable dowel pins 25 and this hub is likewise provided with a plurality of rollers 26 comprising alternating long and short rollers, each roller, like the rollers 15, is provided with a bevel end 27 merging into a pin 28 operating in a guide slot in a collar 29 secured to the end of the hub 23. The opposite or butt ends of the rollers operate in guide slots 30 and abutting against the butt ends of the rollers are springs 31. These rollers 26 are adapted to be moved into radial recesses 32 formed between splines 33 on the sleeve 20.

For moving the rollers 15 and 26 into their respective recesses I provide a sliding collar 34 manipulated by a suitable operating fork 35. This collar when moved to the right will engage first the long and then the short rollers 15 forcing them into the radial recesses 22 in the shaft 7 and when moved to the left will engage first the long and then the short rollers 26 moving them radially into the recesses 32 on the sleeve 20.

In operation the ring gear 5 is continuously driven. If it is desired to operate the shaft 7 at the same speed as the driving shaft 6 the collar 34 is moved to the right forcing the rollers 15 into the recesses 22 and thereby locking the sun gear 13 to the shaft 7. Due to the fact that the pinion carrier 11 is keyed to the shaft 7 the ring gear 5, the pinion carrier 11 and sun gear 13 are all locked together and the shaft 7 will be driven direct from and at the same speed as the driving shaft 6. If it be desired to operate the driving shaft 7 at a different speed from that of the driving shaft 6 the collar 34 is moved to the left thereby moving the rollers 26 into the recesses 32 on the sleeve 20 and as the hub carrying the rollers 26 is stationarily locked to the casing and as the sleeve 20, through the hub of the rollers 15 is connected to the sun gear 13 and likewise to the sleeve 20 the sun gear 13 will be locked against rotation and as a result the shaft 7 will be driven through the planetary gear transmission from the ring gear 5 at a lower speed than the driving shaft 6.

I claim as my invention:

1. The combination with a driving ring gear, of a driven shaft, a pinion carrier connected to said driven shaft, pinions mounted on said carrier and meshing with said ring gear, a sun gear normally rotatable relatively to said driven shaft, a clutch including a plurality of radially movable rollers connected to said sun gear and co-operating with means on the driven shaft for locking said sun gear to said driven shaft and a second clutch including a plurality of radially movable rollers connected to a relatively stationary member and co-operating with means on the sun gear for locking said sun gear against rotation.

2. The combination with a driving ring gear, of a driven shaft, a pinion carrier rotatable with said driven shaft, pinions mounted on said carrier and meshing with said ring gear, a sun gear rotatable relatively to said driven shaft, said driven shaft being provided with radial recesses, a clutch member including a plurality of radially movable rollers connected to said sun gear and movable into said recesses to lock said sun gear to the driven shaft and a second clutch member including a plurality of radially movable rollers for locking said first clutch member against rotation.

3. The combination with a driving ring gear, of a driven shaft, a pinion carrier drivingly connected with said driven shaft, pinions mounted on said carrier and meshing with said ring gear, a sun gear carried by said driven shaft and rotatable relatively thereto meshing with said pinions, said driven shaft having a plurality of radial recesses, a clutch connected to said sun gear comprising a hub having radially disposed slots therein, a plurality of rollers operable in said slots and radially movable into said recesses for locking said sun gear to said driven shaft and a second clutch for locking said sun gear against movement.

4. The combination with a driving ring gear, of a driven shaft, a pinion carrier mounted on said shaft, a plurality of pinions mounted on said carrier and meshing with said ring gear, a sun gear normally rotatable relatively to said driven shaft, said driven shaft being provided with a plurality of radially disposed recesses, a clutch including a plurality of radially movable rollers and a sleeve connected with said sun gear and provided with radially disposed recesses, a second clutch including a plurality of radially movable rollers and normally stationary with respect to said sleeve and means for moving the rollers of said first clutch into their co-operative recesses to lock the sun gear to the driven shaft or for moving the rollers of said second mentioned clutch into their co-operative recesses to lock the sun gear against movement.

5. The combination with a casing, of a driving ring gear, a driven shaft, a pinion carrier drivingly connected with said driven shaft, pinions mounted on said pinion carrier and meshing with said ring gear, a sun gear mounted on said driven shaft and normally rotatable relatively thereto, said driven shaft being provided with a plurality of radially disposed recesses, a hub connected to said sun gear and having a plurality of radially disposed slots and having an extension provided with a plurality of radially disposed recesses, rollers mounted in said slots and arranged to co-operate with the recesses on said shaft, a second hub locked against movement to said casing and provided with a plurality of radially disposed slots and rollers mounted in said slots and arranged to co-operate with the recesses of said hub extension for locking said extension against movement.

In witness whereof, I JOHN M. SIMPSON have hereunto set my hand at Muncie, Indiana, this 31st day of July, A. D. one thousands nine hundred and twenty-five.

J. M. SIMPSON.